H. W. ROELING, E. H. WILLIAMS AND J. G. BAUER.
FUEL HEATER.
APPLICATION FILED MAY 6, 1920.
1,402,658.
Patented Jan. 3, 1922.
2 SHEETS—SHEET 1.
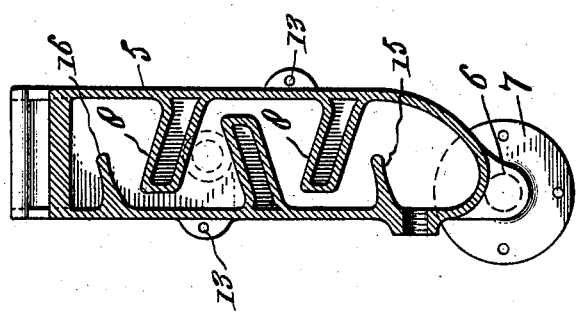
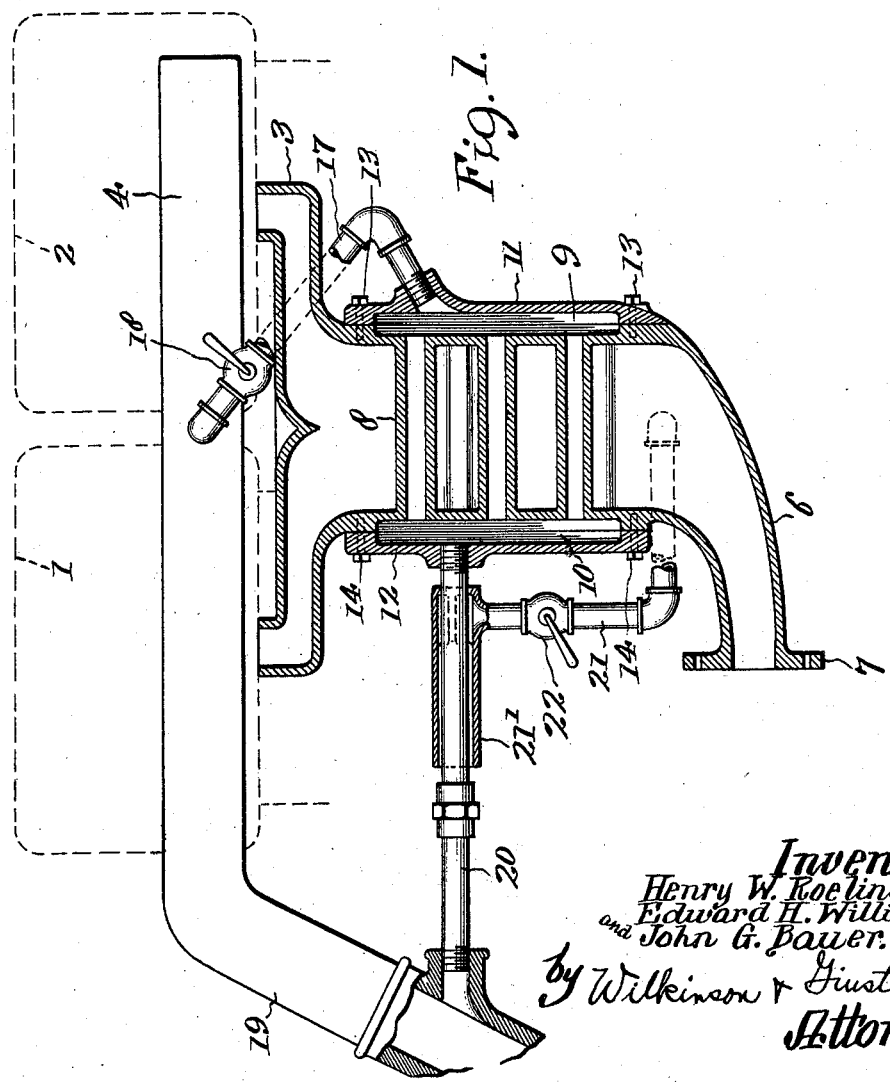
Inventors.
Henry W. Roeling,
Edward H. Williams
and John G. Bauer.
by Wilkinson & Giusta.
Attorneys.

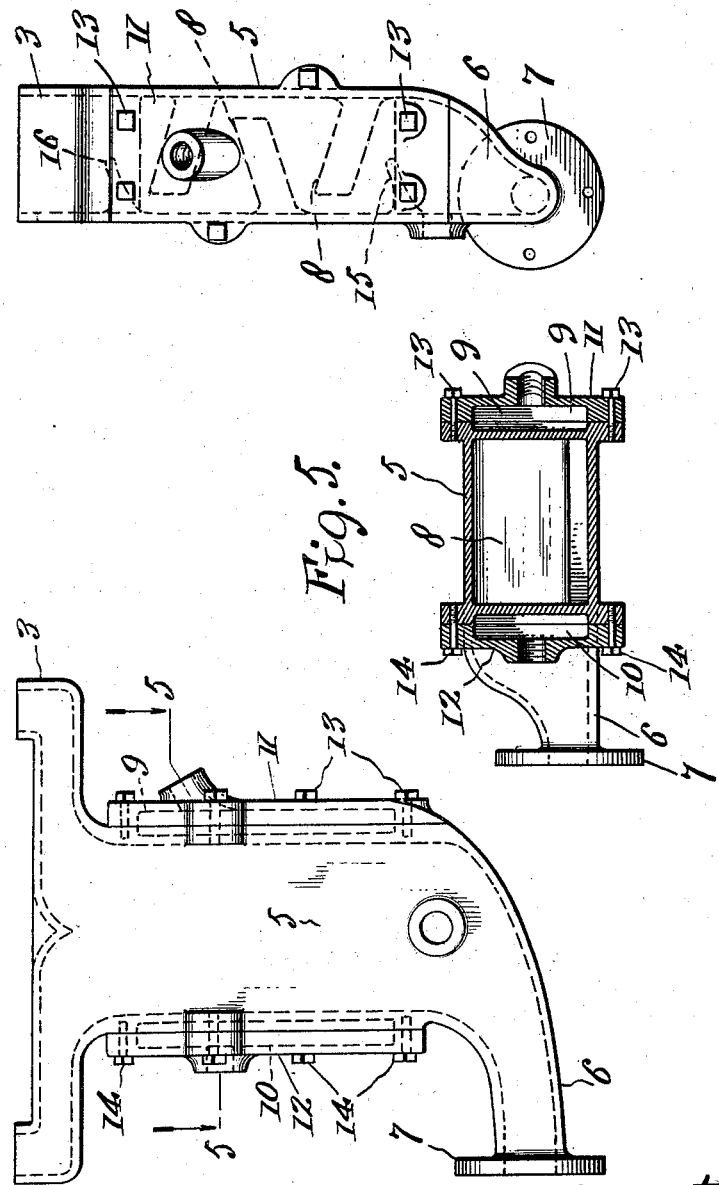

UNITED STATES PATENT OFFICE.

HENRY WILLIAM ROELING, EDWARD HUGH WILLIAMS, AND JOHN GEORGE BAUER, OF NEW ORLEANS, LOUISIANA.

FUEL HEATER.

1,402,658.　　　　　Specification of Letters Patent.　　Patented Jan. 3, 1922.

Application filed May 6, 1920. Serial No. 379,293.

*To all whom it may concern:*

Be it known that we, HENRY WILLIAM ROELING, EDWARD HUGH WILLIAMS, and JOHN GEORGE BAUER, citizens of the United States, all residing at New Orleans, in the parish of Orleans and State of Louisiana, have invented certain new and useful Improvements in Fuel Heaters; and we do hereby declare the following to be a full, clear, and exact description of the invention, such as will enable others skilled in the art to which it appertains to make and use the same.

The present invention relates to improvements in fuel heaters, and proposes to produce an improved device to be used in conjunction with any carbureter in connection with internal combustion engines.

It is an object of the invention to produce a device that will insure the delivery to the cylinders of the engine of a heated fuel in a highly efficient condition in readiness to ignite without the evolution of carbon.

A further object of the invention resides in providing a device of this character which will reduce the consumption of fuel and eliminate to a great extent the obnoxious and poisonous fumes of unburnt gases and offensive smoke and vapors.

In the accompanying drawings forming a part of this application, and in which similar reference symbols indicate corresponding parts in the several views:

Figure 1 is a vertical sectional view through a fuel heater constructed in accordance with the present invention, and illustrated as applied to a gas engine shown partially in elevation and partially in dotted lines.

Figure 2 is a vertical central sectional view through the same.

Figure 3 is a side elevation thereof.

Figure 4 is an end elevation of the generator; and

Figure 5 is a horizontal sectional view taken on the line 5—5 in Figure 3.

Referring more particularly to the drawings, 1 and 2 designate adjacent cylinders of an internal combustion engine having an intake manifold 3 and an exhaust manifold 4. The improved heater is adapted to be placed between the manifolds and the carbureter, and consists of a casing 5 having an elbow 6 on the lower end whereof is a perforated flange 7 by which it is coupled to the carbureter or a pipe extending thereto.

The casing 5 is of substantially rectangular cross section, as indicated in Figure 5, and extending across the same are a plurality of staggered and inclined baffle plates 8 being hollow and communicating at their ends with hollow heads 9 and 10 formed partially by the casing 5 and partially by dished plates 11 and 12 bolted or otherwise secured to the casing 5 or adjacent parts, as indicated at 13 and 14. Other solid baffles 15 and 16 are preferably provided, both extending in the same direction and from the same wall of the pipe section.

The lower baffle 15, as shown in Figure 2, is adapted to direct the mixture against the lowermost hollow baffle plate 8, and thereafter the mixture is caused to follow a tortuous course upwardly until it passes out beyond the uppermost baffle 16 and is received into the intake manifold 3 by which it is distributed to the various cylinders 1, 2, etc.

The exhaust manifold 4 is provided with a pipe or conduit 17 which connects with the head 9 and is adapted to deliver heated exhaust products thereto. A valve 18 in the pipe or conduit 17 serves to control the amount of such products passing to the head 9. Of course the majority of the products of combustion pass through the manifold 4 into the exhaust pipe 19 by which they find their escape to the muffler. A pipe or conduit 20 is also connected between the exhaust pipe 19 and the head 10. There is, therefore, provided a circuit for the products of combustion through the conduit 17, the head 9, thence through the hollow baffle plates 8 to the opposite head 10, whence the exhaust products escape through the conduit 20 to the exhaust pipe 19.

The heat residing in these exhaust products is given up to the baffle plates 8 and in turn is transferred to the mixture passing to the manifold 3 and impinging against the inclined baffle plates 8. A shell 21 of a suitable form surrounds the conduit 20 and has one end thereof in communication with the atmosphere to receive a supply of air, afterwards circulating it in contact with the pipe 20 to become pre-heated. A conduit 21 provided with a controlling valve 22 connects with the heater 21′ and also with the base of the casing 5.

In operation the suction produced in the cylinders of the engine will, in the usual manner, draw the mixture of air and fuel from the carbureter into the elbow 6 and up through the casing 5. Once the engine is started the heated exhaust products therefrom delivered to the exhaust manifold 4 will flow through the baffle plates 8 and heat the gas passing up through the casing 5 to the intake manifold 3.

Air in desirable quantities pre-heated by the action of the shell 21', may also be supplied to the mixture by the action of the valve 22, this air being further heated while it is being mixed with the mixture in the casing 5.

The heater is also useful in receiving liquid coming from the carbureter or other source, inasmuch as the liquid globules coming into contact with the hollow baffle plates 8 will be broken up and converted into vapor. The air being pre-heated by the shell 21' does not reduce the temperature of the mixture.

It is obvious that those skilled in the art may vary the details of construction and arrangements of parts without departing from the spirit of our invention, and therefore we do not wish to be limited to such features except as may be required by the claim.

We claim:

A fuel heater of the character described, comprising a vertically disposed casing rectangular in cross section, said casing being provided with a vertically extending passage therein having an inlet at its base to introduce fuel and outlets at its upper end adapted to connect with the intake manifold of an internal combustion engine, said casing having at its ends depressed portions, dished plates removably fitted over the depressed ends of the casing and forming therewith chambers, hollow baffle plates extending from opposite side walls in staggered relation and being inclined upwardly, said hollow baffle plates communicating at their ends with said chambers, solid baffle plates above and below said hollow baffle plates formed in staggered relation therewith and being also inclined upwardly, a valve controlled pipe connecting one of the heads with the exhaust manifold of the engine, and a second pipe connecting the other head with the manifold towards the delivery end thereof, substantially as described.

HENRY WILLIAM ROELING.
EDWARD HUGH WILLIAMS.
JOHN GEORGE BAUER.